United States Patent [19]

Guillet et al.

[11] Patent Number: 4,536,294

[45] Date of Patent: Aug. 20, 1985

[54] POLYMERIC FLOCCULANTS

[76] Inventors: James E. Guillet, 31 Sagebrush La., Don Mills, Ontario, M3A 1X4; Michael Heskins, 184 St. Germaine Ave., Toronto, Ontario, M5M 1W1; D. Gary Murray, Apt. 304, 1325 York Mills Rd., Don Mills, Ontario, M3A 1Z6, all of Canada

[21] Appl. No.: 477,908

[22] Filed: Mar. 23, 1983

[30] Foreign Application Priority Data

Mar. 23, 1982 [CA] Canada .................................. 399215

[51] Int. Cl.$^3$ .......................... C02F 1/56; B01D 21/01
[52] U.S. Cl. .................. 210/730; 208/11 LE; 209/5; 210/734; 210/737; 210/907
[58] Field of Search ...................... 208/11 LE; 209/5; 210/711, 712, 730, 733, 734, 737, 907; 524/922

[56] References Cited

U.S. PATENT DOCUMENTS

| | | | |
|---|---|---|---|
| 2,860,987 | 11/1958 | Werner | 426/330.3 |
| 3,066,095 | 11/1962 | Hronas | 210/728 |
| 3,128,248 | 4/1964 | Suzuki | 210/706 |
| 3,142,638 | 7/1964 | Blaisdell et al. | 210/695 |
| 3,147,218 | 9/1964 | Booth et al. | 210/734 |
| 3,194,758 | 7/1965 | Lissant | 210/737 |
| 3,201,304 | 8/1965 | Munjat | 162/168.3 |
| 3,235,490 | 2/1966 | Goren | 210/734 |
| 3,338,828 | 8/1967 | Clark | 210/730 |
| 3,342,786 | 9/1967 | Emmons | 526/260 |
| 3,367,918 | 2/1968 | Lesinski et al. | 524/922 |
| 3,412,019 | 11/1968 | Hoover et al. | 210/734 |
| 3,492,226 | 1/1970 | Ryznar | 210/733 |
| 3,502,575 | 3/1970 | Hepp et al. | 210/737 |
| 3,507,847 | 4/1970 | Williams et al. | 210/734 |
| 3,509,021 | 4/1970 | Woodward | 210/728 |
| 3,526,585 | 9/1970 | Camp | 210/734 |
| 3,563,885 | 2/1971 | Talbot | 210/732 |
| 3,634,231 | 1/1972 | Dunseth et al. | 210/718 |
| 3,658,772 | 4/1972 | Volk et al. | 210/734 |
| 3,686,109 | 8/1972 | Aldrich et al. | 210/736 |
| 3,692,673 | 9/1972 | Hoke | 210/734 |
| 3,697,420 | 10/1972 | Blaisdell et al. | 210/695 |
| 3,703,559 | 11/1972 | Kerfoot et al. | 585/451 |
| 3,719,748 | 3/1973 | Manfroy et al. | 210/734 |
| 3,816,305 | 6/1974 | Schutte | 210/702 |
| 4,028,233 | 6/1977 | Quentin et al. | 210/666 |
| 4,059,516 | 11/1977 | Heisey | 210/724 |
| 4,111,803 | 9/1978 | Townend | 210/725 |

*Primary Examiner*—Peter Hruskoci
*Attorney, Agent, or Firm*—Browdy and Neimark

[57] ABSTRACT

There is provided a flocculating process, especially for clay-water suspensions, in which high molecular weight polymers of N-loweralkyl substituted acrylamides and methacrylamides are used as flocculating agent. There are also provided novel polymeric flocculating agents which have the property of exhibiting a critical flocculation temperature, below which they will cause flocculation of suspended solids but above which they are ineffective as flocculants.

13 Claims, No Drawings

POLYMERIC FLOCCULANTS

FIELD OF THE INVENTION

This invention relates to a process for increasing the settling rate of a liquid suspension, more particularly flocculation of a suspension. It also relates to novel polymeric flocculating agents.

BACKGROUND OF THE INVENTION

Flocculation is the aggregation of particles of a colloidal suspension to form larger particles caused by random collisions between the suspended particles. In time, large enough particles are formed such that they will separate out due by gravity. Colloidal suspensions often have a long life due to repulsion between like charges, which keeps the particles from aggregating. Flocculation can be induced by the addition of a flocculating agent, for example an electrolyte, that essentially neutralizes the charged particles so that, subsequently, aggregation may occur. Flocculation is a well-known process in the treatment of sewage sludge and in the treatment of waste water in various industries such as the pulp and paper industry.

BRIEF REFERENCE TO THE PRIOR ART

The prior art contains numerous references to flocculation processes and various proposed flocculating agents. Polymers of acrylamide are commonly employed as flocculating agents. A primary disadvantage of such use of polymers of acrylamide is that they are rapidly hydrolyzed in alkaline solutions and consequently they are impractical for use in various applications that involve alkaline solutions. For example, in wood pulping processes a highly alkaline solution is commonly used. Also, in the preparation of bauxite ore for the electrolytic production of alumina, the bauxite is treated with caustic potash to dissolve the alumina. Mining processes which result in the formation of aqueous clay suspensions present acute flocculation problems. For example, in processing phosphate ores (marine apatites mixed with a montmorillonite type clay) the ore is ground up and separated by flotation. The clay-water mixture is transferred to a settling pond and the supernatant water is reused in the process. However, the clay retains substantial amounts of water and settles to a slime of about 20% solids content. The settling process takes several months but can be accelerated by the use of flocculants.

Treatment of waste water produced by extraction of hydrocarbon values from oil sands poses a particularly difficult waste disposal problem. Oil sands, such as those found in Northern Alberta, Canada; parts of the U.S.A.; the Soviet Union and Venezuela are basically composed of heavy hydrocarbon oil bound into aggregations with inorganic materials, such as sand and clay. To separate and extract the oil from the other components, in one of the most widely used combined processes, portions of the oil sand are ground up with hot water which causes breakdown of the infra-structure and liberation of the individual components. Subsequently the aqueous mixture separates into three phases: settled sand on the bottom, clay fines suspended in water in the middle phase and oil as the top phase which may be easily separated from the two lower phases. It is economically desirable to be able to re-circulate at least a portion of the water to the oil sand extracting process. After oil removal, and perhaps some recycling and reprocessing of portions of the aqueous phase, much of the remaining clay-water phase and the sand phase is discarded into settling ponds. Whilst the sand rapidly sinks to the base of the settling ponds, the remaining aqueous suspension is very stable.

A method of settling this clay suspension so that more water could be recovered, and the land ultimately restored to its original state, would be of considerable commercial value, and also provide a solution to a serious environmental problem.

SUMMARY OF THE INVENTION

It is an object of the present invention to provide novel polymeric flocculants.

It is a further object of the present invention to provide novel polymeric flocculants which are especially useful in enhancing settling of spended clay fines from aqueous suspensions.

It is further object of the invention to provide novel flocculation processes for treating waste waters resulting from ore and tar sands extractions.

The present invention provides, in one aspect, a novel class of polymeric flocculants which exhibit a phenomenon referred to herein as "critical flocculation temperature" or CFT, which is a temperature below which they exhibit flocculating ability but above which they will not effect flocculation of solids suspended in aqueous liquids, the effect being substantially reversible upon raising and lowering the temperature through the CFT. The CFT is closely related to the critical solution temperature of the polymer.

Examples of the polymers exhibiting a CFT are polymers of N-(mono or di-lowerakylsubstituted)acrylamide or methacrylamide, e.g. N-isopropylacrylamide (NIPAM) and copolymers thereof with up to 50% of another monomer. Another example is methylcellulose.

In another aspect, the present invention provides a flocculation process in which polymeric flocculants having a CFT are used and their feature of critical flocculation temperature is put to use, whereby the occurrence of flocculation is controlled and adjusted by temperature variation.

DESCRIPTION OF THE PREFERRED EMBODIMENTS

The preferred polymers useful in the present invention are polymers of compounds which correspond to the general formula:

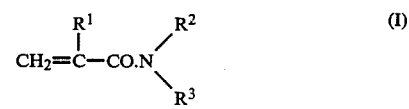

in which
R$^1$ represents hydrogen or methyl;
R$^2$ and R$^3$ represent groups independently selected from hydrogen and C$_1$-C$_6$ straight or branched chain alkyl, with the proviso that both R$^2$ and R$^3$ are not hydrogen.

Most preferred are those in which one of R$^1$ and R$^2$ is methyl, isopropyl, propyl, n-butyl, s-butyl or t-butyl.

The polymers used in the above invention should preferably exhibit a CFT or critical solution temperature CST in the 0°–80° C. approximate range. Of the polymers of monomers of formula I given above, in some cases high molecular weight homopolymers will exhibit a suitable CST. In other cases it is necessary to copolymerise them in suitable amounts with other copolymerizable monomers to obtain high molecular weight polymers of suitable CFT and CST. For example, homopolymers of N-isopropyl-acrylamide (NIPAM) exhibit a suitable CFT. Its CFT can however be adjusted by copolymerization with different amounts of a copolymerizable monomer, the water solubility of the homopolymer of which is different from that of poly NIPAM, such as acrylamide. On the other hand, homopolymers of N-methylmethacrylamide (NMMA) are water soluble throughout the range 0°–100° C. so that NMMA should be copolymerized with the appropriate amounts of a comonomer which yields water insoluble polymers e.g. acrylonitrile, to obtain high molecular weight copolymers exhibiting a suitable CFT. Conversely, monomers of formula I where one or both of $R^2$ and $R^3$ is alkyl $C_4$ or higher will yield homopolymers insoluble in water at all temperatures from 0°–100° C., and so they should be copolymerized with monomers which yield water soluble polymers such as acrylamide.

The most preferred are polymers and copolymers of N-isopropylacrylamide (NIPAM), and so the invention will be subsequently described with specific reference thereto, although it will be readily apparent that similar coinsiderations apply to the other polymers within the scope of the invention.

Polymers of NIPAM, although similar in structure to polyacrylamide, show many unusual and unexpected properties when used as organic flocculants. In particular, they are very resistant to hydrolysis in alkaline media, and provide rapid and efficient flocculation, often at concentrations much lower than conventional flocculants. When used in appropriate concentrations and formulations with mixed suspensions of clay and sand they give rise to "homogeneous flocculation", that is, the clay and sand come down together in a relatively homogeneous mixture, rather than settling separately into two layers with the sand at the bottom and the slower settling clay in a high water content, slime layer on top. This is particularly important if the land under tailings ponds must be recovered. The process for flocculating a liquid suspension according to the present invention has the advantage that it may be carried out at the original site where the suspension to be flocculated is located, for example, in the effluent waste stream at the pulp and paper mill, or in sludge digestor tank in the sewage treatment plant or at the settling ponds situated near the oil fields and refining plants.

It is a further advantage of the present invention that it permits the efficient flocculation of solids of a suspension in an acid, alkaline, neutral, aqueous or non-aqueous medium thereby providing a wide area of possible applications.

It is another advantage of the present invention that flocculation and increased settling rate may be achieved by using one or more of a variety of homo and copolymers of NIPAM and the like which, depending on the selected flocculant, permit the process to be conducted over a wide range of temperatures, and with anionic, cationic or non-ionic characteristics.

In a preferred embodiment of this invention, a polymer or copolymer of NIPAM is used as the flocculating agent in treating a mixture of sand particles and suspended clay such as that produced in the tar sands extraction process. This flocculant causes homogeneous flocculation of clay fines and sand. The solids content of the settled layer depends on the relative amounts of clay and clay in the mixture but is typically in the range 60–80% in a weight basis. The removed water is pure enough to allow for its reuse or disposal in rivers.

The critical flocculation temperature (CFT) of the flocculant can be adjusted so that the flocculant operates to settle fines at a lower temperature in settling tanks and ponds, but does not cause premature flocculation in a process which is run at a higher temperature, and in which recycle water containing minor amounts of flocculant is warmed and fed back to the processing operations. For example, in the most commonly employed process for oil sand extraction, as previously mentioned, the oil sand is mined and subjected to a hot water (80° C.) shearing process to break up the tar sand structure and liberate the oil components. Conventionally, from the cooled three-phase mixture formed the oil is removed to leave the two lower phases comprising a suspended clay fines and water phase, and a lowermost, sand phase. The sand and clay fines are subsequently pumped to tailing ponds which have an average temperature of less than 20° C.

It is desirable to add the flocculant to the aqueous mixture after the oil is removed but before any further water recycling processes, to ensure maximum flocculation of the suspended solids in the aqueous phase.

The preferred polymeric flocculants for use in the present invention have a CFT such that they do not effect flocculation and/or they are substantially insoluble in water, at the temperature at which the hot water oil sand extraction process is conducted. As such, one can arrange that they do not recycle to the extraction process in the recycled process water, or at least are not flocculation effective at the temperatures to which the water will be revised, and thus minimize the risk that they might interfere with the oil extraction process. Thus, in the preferred process of the invention the flocculant may be added to the oil-free, cooled aqueous phase at any temperature below its CFT to perform its flocculation function, and any dissolved flocculant present in the subsequently recycled process water will precipitate out when the temperature thereof is raised prior to conducting the oil sands separation process. Consequently the polymeric flocculant will not affect the separation efficiency.

Preferred polymers for use in the present invention thus have a CFT below about 70° C., preferably in the range from about 20° C. to about 70° C. and most preferably in the approximate range of 30° C.–50° C., such temperatures being below those at which the oil sands separation process is conducted. The CFT of a given polymer is determined, inter alia, by its composition and molecular weight. Within the scope of the present invention, polymers and copolymers of NIPAM can be devised having a wide range of appropriate critical flocculation temperatures.

The preferred polymers used as flocculants in the process of the present invention are homo-and copolymers of NIPAM with a high molecular weight. The molecular weight is most suitably at least $1 \times 10^6$ g/mol, to ensure an efficient flocculation and to demonstrate the CFT, and most preferably in the range of $1$–$200 \times 10^6$ g/mol, although lower molecular weights, e.g. down to $0.5 \times 10^6$ may be required for other specific applications. These figures correspond to viscosity average molecular weights and are calculated from the limiting viscosity number determined on the polymer. The method of polymerization for making these polymers, in the suitable molecular weight range, is dependent upon the desired polymer flocculant. The homopolymer of N-isopropylacrylamide, poly(N-isopropylacrylamide), poly(NIPAM), may be polymerized to a suitably high molecular weight, by free radical polymerization in aqueous medium using a persulphate/bisulphite initiator or other water soluble free radical catalyst.

Numerous copolymers of NIPAM have been found to be effective and efficient in the flocculation of suspensions of the nature described herein. These copolymers should contain at least 50% NIPAM polymerized units and can be polymerized to a suitably high molecular weight by using one or more of anionic, cationic or free radical polymerization methods. The initiators and appropriate reaction conditions of these polymerization techniques are within the skill of the art. The following are examples of useful potential comonomers, but in no way comprises an exhaustive list. The comonomers are listed corresponding to the type required to achieve efficient flocculating properties:

Anionic flocculants, made by copolymerization of NIPAM with:
acrylic acid,
sodium acrylate,
methacrylic acid,
acrylic acid acrylamide;
Cationic flocculants, made by copolymerization of NIPAM with:
dimethylaminopropyl methacrylamide (DMAPMA),
methacrylamidopropyltrimethylammonium chloride (MAPTAC),
2-hydroxy-3-methacryloxypropyltrimethyl ammonium chloride,
methacrylamido-hydroxypropyltrimethylammonium chloride (G-MAC),
vinyl pyridine
Non-ionic flocculants, made by copolymerization of NIPAM with:
acrylamide,
methacrylamide,
N,N-dimethylacrylamide,
N-methylol acrylamide,
hydroxypropyl acrylate,
N-vinylpyrrolidine,
diacetone-acrylamide,
2-hydroxypropylmethacrylate,
2-hydroxyisopropylacrylamide,
acrylonitrile,
methacrylonitrile,
styrene,
alkyl methacrylates,
and combinations thereof.

Flocculation and an increased settling rate may also be brought about by using two or more of the above described polymers in combination, the requisite amounts of which may be determined by routine experimental testing. The type of flocculant used, whether a single polymer or a combination of polymers will determine the nature of the resulting floc.

Homogeneous flocculation of clay and sand can be effected by use of non-ionic polymers and copolymers of NIPAM containing at least 50% NIPAM units on a molar basis. Such polymers flocculate the heavier suspended clay particles to give a very rapid flocculation and settling thereof with the sand components. Other types of polymer flocculants used in the present invention appear more readily to flocculate the finer suspended clay particles, with the result that they cause a more thorough flocculation over time, giving maximum solids content in the deposited layers and minimum residual solids content in the remaining liquid, but over a relatively longer period of time.

Specific examples of polymers which will give homogeneous floc formation are homopolymeric NIPAM and copolymers of NIPAM containing not more than 50 mole percent acrylamide.

Suitable amounts of polymeric flocculant used in the present invention are up to 600 ppm, based on the weight of the aqueous suspension to be treated. Preferred amounts are from 50–400 ppm. Higher amounts, although effective, are uneconomic in practice.

The process of the present invention increases the rate of settling of a sand-clay mixture in a settling pond quite substantially. In ordinary practice the suspended materials in settling ponds require up to 7 years to settle, and even then the "settled" solids layer is of slimey, semi-solid consistency having only about 30% solids content. With the process of the present invention the settling pond is flocculated such that within 1–3 days most of the suspended material has settled and subsequently the excess water may be removed. Enough water can be removed from the pond to yield a surface composition of 60–70% solids content, firm enough to drive on and use for various practical purposes.

The invention is further illustrated by the following specific examples.

The polymeric flocculants were prepared from NIPAM monomer with or without comonomers by the procedures described in Examples 1 to 7.

EXAMPLE 1

Homopolymer, H-1

A solution of 10% w/v of NIPAM monomer is deionised water was prepared in a round-bottomed flask fitted with a stirrer, a gas inlet and a rubber septum. The solution was degassed by successively evacuating the flask and then purging with nitrogen. This was repeated five times and the flask was sealed off. While stirring, 100 ppm w/w potassium bisulphite followed by 300 ppm w/w potassium persulphate (based on monomer) were added to the solution and polymerization was allowed to proceed at room temperature. After 10 minutes the viscosity of the solution began to increase; after 20 minutes the solution was difficult to stir and stirring was stopped. The polymerization was allowed to continue overnight to ensure complete polymerization. In the tables that follow, this polymer is designated H-1. It had a limiting viscosity $[\psi]$ of 3.4, and a viscosity average molecular weight calculated therefrom of $6.8 \times 10^6$.

EXAMPLE 2

Anionic Copolymer, A-1 (11.9 mol-% sodium acrylate)

A solution of 4.5% w/v NIPAM and 0.5% w/v sodium acrylate (prepared from acrylic acid) in deionized water was prepared in a flask fitted with a stirrer, a gas inlet and a septem. The solution was degassed as in Example 1 and sealed. Potassium bisulphite (600 ppm w/w, on monomer) followed by 600 ppm w/w (on monomer) of potassium persulphate were added as deoxygenated solutions by syringe and the solutions were allowed to stir at room temperature. After 30 minutes the solutions were viscous and stirring was stopped, but the polymerization was allowed to continue overnight. The copolymer A-1, at pH 7, had a limiting viscosity $[\eta]$ of 8.9, and a viscosity average molecular weight calculated therefrom of $125 \times 10^6$. In a similar manner, copolymers of NIPAM and methacrylamidohydroxypropylammonium chloride were prepared.

EXAMPLE 3

Anionic Copolymer A-2 (1.5 mole-% sodium acrylate)

The procedure for Example 2 was repeated except that the solution contained 4.94% w/v NIPAM and 0.062% sodium acrylate in deionised water. After deoxygenation the amount of catalyst added was 250 ppm w/w (on monomer) for potassium bisulphite and 750 ppm w/w (on monomer) for potassium persulphate.

EXAMPLE 4

Nonionic Copolymer N-1 (16.6 mole-% acrylamide)

The method of Example 2 was repeated, except that the solution contained 4.44% w/v NIPAM and 0.56% w/v acrylamide. After deoxygenation the amount of catalyst added was 250 ppm w/w for potassium bisulphite and 750 ppm w/w for potassium persulphate. The stirring was stopped after one hour. Polymerization was stopped after two days. The resulting polymer had a limiting viscosity $[\eta]$ of 4.5, viscosity average molecular weight $16.3 \times 10^6$.

EXAMPLE 5

Nonionic Copolymer N-2 (40 mole-% acrylamide)

The method was identical to Example 2 except that the solution contained 3.52% w/v NIPAM and 1.48% w/v acrylamide. Polymerization was stopped after seven days. The resulting polymer had a limiting viscosity $[\eta]$ of 5.0, viscosity average molecular weight $21.6 \times 10^6$.

EXAMPLE 6

Nonionic Copolymer N-3 (MHC-MB) 30 mole-% acrylamide

The method was identical to Example 2 except that the monomer solution contained 3.94% w.v NIPAM and 1.06% w/v acrylamide. The stirrer was stopped after 30 minutes and polymerizaton was stopped after one day. The resulting polymer had a limiting viscosity $[\eta]$ of 5.3, viscosity average molecular weight $26 \times 10^6$.

EXAMPLE 7

Cationic Copolymer C-1 (35 mole-% MAPTAC)

A solution of 9.6% w/v NIPAM and 10.4% w/v methacrylamidopropyltrimethylammonium chloride (Jefferson Chemical Co., MAPTAC) in deionised water was prepared. The stabilizer in MAPTAC was removed by passing the aqueous solution of MAPTAC through a charcoal column prior to the preparation of the polymerization solution. After deoxygenation, 200 ppm w/w (on monomer) of potassium bisulphite and 400 ppm w/w (on monomer) was added by syringe. After five days polymerization was complete. In a similar manner, copolymer of NIPAM and dimethylaminopropyl methacrylamide were prepared.

EXAMPLE 8

In an industrial process for producing fine papers, a mixture of $TiO_2$, clay and paper fibres in water is treated with a flocculant which causes the binding of the fillers to the paper. Flocculants based on NIPAM were tested for this purpose.

A suspension of 0.06% $TiO_2$ (anatase) and 0.06% clay was prepared and flocculated with various polymers. The results are given in Table I.

TABLE I

| NIPAM | Flocculant | | | Amount required, |
|---|---|---|---|---|
| % | Comonomer | Mole % | Type | ppm |
| 94 | Na acrylate | 6 | Anionic | 50 No flocculation |
| 85.3 | MAPTAC | 14.7 | Cationic | 4 Flocculation |
| 92.8 | DMAPMA | 7.2 | Cationic | 4 Flocculation |
| 95 | G Mac | 5 | Cationic | 8 Flocculation |
| 100 | — | — | Homo-polymer | 50 No flocculation |

EXAMPLE 9

Effect of Added Sand to Flocculation of Phosphate Slime

Phosphate slime (9 ml, 16.1% w.v solids) was added to 13 g wet sand (part of overburden to phosphate deposits, 96.7% solids w/w) in a 25 ml stoppered graduated cylinder. Water was added to 25 ml and the cylinder contents mixed. NIPAM polymers were added to flocculate the clay. The level of the settled solids within the graduated cylinder after various times was recorded and the results are given in Table II. The lower the figure for the volume of settled solids, the lower the amount of water remaining associated with the solids, and hence the better the flocculating achieved.

TABLE II

| NIPAM | Flocculant | | | Amount added, | Volume of settled solids | |
|---|---|---|---|---|---|---|
| % | Comonomer | Mole % | Type | ppm | 1 hr. | 20 hr. |
| 100 | | | Homo | | 22 | 17.6 Homogeneous |
| 90 | Acrylamide | 10 | Nonionic | 240 | 18.6 | 17.0 Homogeneous |
| 62 | Acrylamide | 38 | Nonionic | 240 | 18.5 | 17.4 Homogeneous |
| 93 | MAPTAC | 7 | Cationic | 680 | 20.5 | 17.7 Inhomogeneous |

EXAMPLE 10

A suspension of phosphate clay (25 ml, 6.0% w/w) was placed in each of three stoppered cylinders. To each was added a sufficient amount of various polymers to flocculate the suspended solids. The level of the settled solids after various times was determined and recorded as previously described, and the results are given in Table III.

TABLE III

| NIPAM | Flocculant | | | Amount added, | Volume of Settled Solid | | | | |
|---|---|---|---|---|---|---|---|---|---|
| % | Copolymer | Mole % | Type | ppm | 1 hr | 3 hr | 21 hr | 49 hr | 10 wk |
| Control | — | — | — | | 24.5 | 24 | 22 | 21 | 17 |

TABLE III-continued

| NIPAM | Flocculant | | | Amount added, | Volume of Settled Solid | | | | |
|---|---|---|---|---|---|---|---|---|---|
| % | Copolymer | Mole % | Type | ppm | 1 hr | 3 hr | 21 hr | 49 hr | 10 wk |
| 0 | Na acrylate | | Anionic | 40 | 18.2 | 15.8 | 15.4 | 15.0 | — |
| 62 | Acrylamide | 38 | Nonionic | 120 | 18.7 | 16.6 | 16.0 | 15.8 | — |

EXAMPLE 11

Example of Flocculation of Clay Suspensions

A 3% clay suspension was prepared and flocculated with various NIPAM polymers. The results are compared with various commercial flocculants in Table IV.

TABLE IV

| NIPAM | POLYMER | | | Amount required for flocculation, | Appearance of supernatent |
|---|---|---|---|---|---|
| % | Comonomer | Mole % | Type | ppm | water |
| 88.5 | MAPTAC | 11.5 | Cationic | 4 | Cloudy |
| 95 | G-MAC[a] | 5 | Cationic | 4 | Cloudy |
| 94 | Na acrylate | 6 | Anionic | 4 | Very cloudy |
| 88.2 | Na acrylate | 11.8 | Anionic | 4 | Very cloudy |
| 100 | | | Homopolymer | 256 | — |
| | Percol 722[b] | | Cationic | 4 | Cloudy |
| | Cyanamer A370[c] | | Anionic | 136 | Very cloudy |
| | Cyanamer P-26[d] | | Anionic | 195 | Very cloudy |

[a]G-MAC is methacrylamido hydroxypropyltrimethylammonium chloride from Shell Chemical Co.
[b]Percol is a "medium cationic" acrylamide copolymer from Allied Colloids.
[c]Cyanamer A-370 is an acrylamide copolymer with "substantial carboxylate content" from Cyanamid of Canada.
[d]Cyanamer P-26 is an acrylamide copolymer of "low carboxylate content" from Cyanamid of Canada.

EXAMPLE 12

Samples of mixtures of sand and clay fines were prepared from sand and fines from a tar sands tailings pond. The samples were placed in a 25 ml stoppered cylinder; the sands/fines ratio of the samples ranged from 3:1 to 14:1. Additions of dilute solutions of NIPAM flocculants were added incrementally until the floc settled rapidly. The composite solids content of the floc was high and visual inspection of the floc indicated whether the floc was inhomogeneous or homogeneous. The solids content of the floc was calculated from the volume of the settled floc and the solids content of the original suspension. The results are shown in Table V.

EXAMPLE 13

Into a round bottom flask fitted with a mechanical stirrer was placed sand, clay fines and water. The mixture was stirred rapidly to produce a homogeneous suspension. Predetermined amounts and combinations of flocculants were added rapidly from a syringe. After 30 seconds of stirring the mixture was allowed to settle and the floc was visually inspected and determined for solids content. The results are shown in the following Table VI.

TABLE VI

| Sand Fines | Solids Content %, W/W | Polymer | Type of Flocculants Used | Amount ppm | Type of Floc |
|---|---|---|---|---|---|
| 10:1 | 62 | A1 | anionic | 28 | homo |
| | | H1 | homo | 80 | |
| 10:1 | 62 | A1 | anionic | 40 | inhomo |
| | | H1 | homo | 32 | |
| 10:1 | 62 | A1 | anionic | 36 | homo |
| | | N3 | nonionic | 40 | |
| 10:1 | 62 | A1 | anionic | 60 | inhomo |
| 10:1 | 62 | H1 | anionic | 150 | homo |

TABLE V

| Sand/ Fines Ratio | Total Solids Content % W/V | Polymer | Flocculant Type | Amount Used ppm. | Type of Floc | % Solids In Sediment W/V | W/W |
|---|---|---|---|---|---|---|---|
| 3:1 | 47.7 | H-1 | homopolymer | 510 | homogeneous | 66.8 | 47.6 |
| 6:1 | 43.1 | H-1 | homopolymer | 224 | homogeneous | 84.7 | 52.3 |
| 10:1 | 48.4 | H-1 | homopolymer | 140 | homogeneous | 102.1 | 63.3 |
| 10:1 | 48.4 | A-1 | anionic | 56 | inhomogeneous | 109 | 65.9 |
| 8:1 | 59.6 | H-1 | homo | 300 | homogeneous | 94.4 | 60.3 |
| 8:1 | 59.6 | N-1 | nonionic | 252 | homogeneous | 97.4 | 61.9 |
| 8:1 | 59.6 | P-250* | anionic PAM | 200 | inhomogeneous | 104.1 | 64.1 |
| 10:1 | 61.3 | H-1 | homo | 240 | homogeneous | 100.1 | 62.5 |
| 10:1 | 61.3 | N-2 | nonionic | 160 | homogeneous | 110.0 | 66.3 |

*P-250 is a trade designation for a polyacrylamide, American Cyanamid Co.

TABLE VI-continued

| Sand Fines | Solids Content %, W/W | Polymer | Type of Flocculants Used | Amount ppm | Type of Floc |
|---|---|---|---|---|---|
| 10:1 | 61 | A2 | anionic | 150 | nomo |

It was found that, generally, when a combination of flocculants is used the total amount of flocculant required for homogeneous flocculation was lowered.

EXAMPLE 14

A filtration apparatus was set up with provision for the collection and measurement of the filtrate volume during a filtration.

Into a flask was placed 100 ml of fresh, activated sewage sludge. The sample was gently stirred for 30 seconds with a predetermined amount of flocculant and was then allowed to sit for several minutes until sedimentation was essentially complete.

The flocculated sludge was filtered and the volume of filtrate was measured after 15, 30, 45, 60, 90 and 120 second time intervals.

A graph of time/volume filtered vs. volume was plotted and the slope of the resulting plot was measured.

It was then possible to calculate the specific filter resistance r, which was determined using the following equation:

$$r = 2bPA^2/cu$$

such that
- r = specific filter resistance
- b = slope of graph of (TIME/VOLUME FILTERED) vs volume
- P = pressure (dynes/cm)
- A = area of filter (cm$^2$)
- c = concentration of sewage solids in gm/ml
- u = viscosity of sludge (poise)

In general, the specific filter resistance should range from 100 to 1 (in units of $10^{10}$ cm/gm), the lower the number, the better the filtration.

In this example sludge samples were treated with either a cationic poly(NIPAM) copolymer (containing 35 mole % methacrylamidopropyltrimethylammonium chloride) (Cl), or a commercial cationic acrylamide copolymer and the results, which may be seen in Table VII below, were compared.

TABLE VII

| Cationic poly(isopropyl-acrylamide) copolymer | | Commercial cationic acrylamide copolymer | |
|---|---|---|---|
| Amount Added (ppm) | Specific Filter Resistance × $10^{-10}$ cm/gm | Amount Added (ppm) | Specific Filter Resistance × $10^{-10}$ cm/gm |
| 0 | 14 | | |
| 40 | 5.4 | 33 | 5.4 |
| 80 | 3.4 | 98 | 3.1 |
| 120 | 2.8 | 160 | 2.5 |
| 200 | 2.2 | 200 | 2.7 |
| 240 | 2.2 | 225 | 2.3 |
| 320 | 1.7 | 325 | 2.9 |

It was found, generally, that at moderate and higher concentrations, the polymer flocculant of the present invention seemed to lower the specific filter resistance by a significantly greater amount than the commercial acrylamide copolymer at approximately the same concentration.

EXAMPLE 15

Samples of flocculated phosphate slime, which is essentially a clay product, recovered from settling ponds of phosphate mines, were tested for load bearing capacity.

Samples of 30 gm of phosphate slime and 75 gm of wet sand were mixed in flasks and allowed to settle. The mixture was then tested for its load bearing properties by measuring the depth of penetration of a weighted rod into the mixture. If the penetration is less than 1 cm after a time period of 30 seconds, then the weight on the rod is increased until penetration is obtained. Between each weight increase the mixture was lightly mixed and tapped. The equivalent load was then calculated from the weight of the rod and subsequently added weights, the amounts of which were just less than the weight required to cause penetration in a 30 second time period. For various levels of flocculant, added to the samples, and using a commercial flocculant, namely CYANAMER A-370 in one sample and a poly(NIPAM) flocculant in the other sample, the load bearing test was repeated. The results may be seen in Table VIII below.

TABLE VIII

| | Equivalent Load (PSI) | |
|---|---|---|
| Amount of flocculant (ppm) | Poly(isopropyl acrylamide) flocculant | Commercial flocculant |
| 0 | 1 | 1 |
| 330 | 2 | 2 |
| 500 | 2 | 3 |
| 670 | 5 | 3 |
| 800 | 5 | 2 |

The equivalent load was found to be greater when a poly(NIPAM) flocculant was used than when a commercial flocculant was used. The amount of flocculant added when the highest load bearing capacity was reached was approximately equal to the amount of flocculant required to flocculant the slime present in the sample. It is believed that a material with a load bearing capacity of 5 psi will support all terrain vehicles.

EXAMPLE 16

Effect of Temperature on the Flocculation of Clay Fines

The homopolymer NIPAM has an upper critical solution temperature of 31° C. over a range of concentrations between 0.5 and 20% polymer in water. At less than 0.5%, the critical solution temperature rises to a value of about 40° C. at infinite dilution. This defines the critical flocculation temperature (CFT). Below the CFT the polymer acts as a flocculant while above this temperature it is ineffective. This is demonstrated by adding 400 ppm polymer H-1 to suspensions of clay fines in water at various temperatures. The results are given in Table IX.

TABLE IX

| Effect of Temperature on Flocculation | | | | | | | | |
|---|---|---|---|---|---|---|---|---|
| Temperature | 15 | 20 | 25 | 30 | 35 | 37.5 | 40 | 45 |
| Flocculated | Yes | Yes | Yes | Yes | Yes | No | No | No |

The temperature at which the flocculant becomes ineffective in water can be adjusted by copolymerization with other vinyl monomers. Copolymerization with water-soluble monomers such as acrylamide, acrylic acid, etc. increase the temperature, while copolymers with more hydrophobic monomers such as acrylonitrile and tertiary butyl acrylamide reduce this temperature. This property is useful in applications where flocculation is required at one temperature but is undesirable at higher processing conditions. This gives the flocculant a delayed-action effect. It can be added to process water at elevated temperatures but flocculation will only occur after the system is cooled below the critical flocculation temperature.

EXAMPLE 17

A series of copolymers was prepared with varying amounts of different comonomers. The critical flocculation temperature was determined by dissolving 0.4% of the polymer in water and heating until phase separation was observed. The results are summarized in Table X.

TABLE X

| Polymer | Copolymer | Mole % | Precipitation temperature, °C. |
|---|---|---|---|
| TS 2 | — | — | 31 |
| MHC 21B | Acrylic acid | 28.2 | 25[a] |
| MHC 28B | Sodium acrylate | 23.1 | 60[b] |
| TS 125 | Sodium acrylate | 2.5 | 38 |
| TS 72 | MAPTAC | 11.5 | 80 |
| MHC 17A | Acrylamide | 30 | 54 |
| TS 31 | N—vinylpyrrolidone | 10 | 38 |
| TS 24 | N,N—dimethylacrylamide | 5 | 34 |
| TS 61 | Diacetone acrylamide | 9.3 | 28 |
| TS 13 | 2-Hydroxypropyl methacrylate | 8.8 | 0 |

[a] pH = 3.
[b] pH = 8.

EXAMPLE 18

This example shows the effect of comonomer concentration on precipitation temperature. A series of copolymers of NIPAM with varying amounts of acrylamide were prepared and the CFT measured as described in example 17. The results are shown in Table XI.

TABLE XI

| Polymer | Acrylamide Content, mole % | Precipitation temperature, °C. |
|---|---|---|
| TS 15 | 4.7 | 37 |
| TS 19 | 9.2 | 40 |
| TS 20 | 16.6 | 44 |
| MAC 17B | 30 | 54 |
| TS 21 | 40 | 77 |
| MAC 17C | 50 | 100 |
| MAC 17D | 70 | 100 |

EXAMPLE 19

The alkaline hydrolysis of polymers of acrylamide and N-substituted acrylamides causes the formation of acrylic acid groups in the polymer, which are usually present as a sodium or potassium salt, depending on the base used for hydrolysis. The presence of these groups in poly(NIPAM) causes an increase in the critical precipitation temperature. The hydrolysis of poly(NIPAM) was examined by treating a solution of poly(NIPAM) in 0.25M NaOH for an extended length of time. Occasionally, a sample was removed, isolated, and the nitrogen content of the recovered polymer determined. In addition, measurements were made of the Critical precipitation temperature of the NIPAM solutions. A control sample of polyacrylamide was treated by the same procedure. The results are shown in Table XII.

TABLE XII

| | Poly(NIPAM) (2% solution) | | Poly(acrylamide) (2% solution) | |
|---|---|---|---|---|
| Time days | Precipitation temperature, °C. | Nitrogen content | Nitrogen content | % Hydrolysis |
| 0 | 26 | 12.5 | 22.5 | 0 |
| 3 | 27 | 12.8 | 12.3 | 41 |
| 18 | 26 | 12.6 | 9.5 | 55 |
| 84 | 27 | — | — | — |
| 380 | 27 | — | — | — |

Since the precipitation temperature of poly(NIPAM) is very sensitive to the presence of acrylic acid groups, the fact that the precipitation temperature remains constant shows that virtually no hydrolysis occurred over more than a year of the test, whereas with polyacrylamide, more than 41% occurred in three days.

In further tests, it was shown that copolymers of acrylamide and poly(NIPAM) hydrolyzed much more slowly than polyacrylamide itself.

The limiting viscosity number $[\eta]$ is calculated from the formula $$[\eta] = \sqrt{\frac{(\eta_{sp}/c) - (\ln\eta_r/c)}{0.5\,c}}$$

$\overline{M}_v$ is calculated from the formula $[\eta] = 1.9 \times 10^{-2} \overline{M}_v^{0.33}$ where $[\eta]$ is the limiting viscosity number at 30° C. in water.

EXAMPLE 20

3.0 g acrylonitrile (AN) and 7.0 g n methyl methacrylamide (NMMA) were dissolved in 100 cc distilled water containing 0.1% ammonium persulfate and 0.1% potassium bisulfite. The solution was flushed with nitrogen and heated in a sealed polymerization bottle for 16 hours at 45° C. The polymer precipitated from solution as a gelatinous white precipatate at 45° C. On cooling, the polymer dissolved to form a very viscous solution. Conversion to polymer was >95% basd on titration of residual monomer in the solution. The intrinsic viscosity of the polymer in water at 5° C. was 3.2 indicating a molecular weight in excess of one million.

EXAMPLE 21

Procedure of example 20 was repeated with the following concentrations of AN and NMMA.

| | AN | NMMA | % YIELD |
|---|---|---|---|
| A. | 0 grams | 10 grams | 92 |
| B. | 1.0 | 9.0 | 95 |
| C. | 2.0 | 8.0 | >90 |
| D. | 4.0 | 6.0 | >85 |

Polymers A, B and C were soluble in water. Polymer D was sollen in water but did not dissolve at any temperature.

Polymer A (pure poly N methyl methacrylamide) was soluble in water at all temperatures and did not show a CST.

Polymers B and C were soluble in cold water but began to precipitate from solution at about 70° C. and 50° C. respectively.

Polymers A, B and C were tested for flocculating capability by the procedures described in Example 11. All three were effective in flocculating a 3% clay suspension at flocculant levels exceeding 40 p.p.m. at 25° C. When flocculation tests were carried out at 80° C. flocculation was observed with sample A but not samples B and C since they were above their critical solubility temperatures (CST.).

EXAMPLE 22

High molecular weight copolymers of acrylamide and tert.butylacrylamide tBAM were prepared by the procedure of example 20 with the following compositions.

| No. | Composition % Acrylamide | % tBAM |
|-----|--------------------------|--------|
| A | 10 g | 0.0 |
| B | 9.0 g | 1.0 |
| C | 8.0 g | 2.0 |
| D | 7.0 g | 3.0 |
| E | 6.0 g | 4.0 |
| F | 0.0 g | 10.0 |

Samples A and B were soluble in water at all temperatures. Sample F was insoluble in water at all temperatures. Samples C, D and E showed critical solution temperatures which decreased with the amount of tBAM present in the copolymer. All the water soluble polymers showed flocculating activity by the tests described in Example 11 over the temperature range from 0° C. up to the CST.

EXAMPLE 23

A high molecular weight polymer of N-propyl acrylamide was prepared by the procedure of Example 20. This polymer was soluble in water at 5° C. but precipitated from solution when heated above 20° C. Flocculation tests with clay slurries showed it to be an effective flocculant at temperatures below 20° C. A copolymer of 80% N-propyl acrylamide and 20% acrylamide was insoluble in water above about 40° C. but was an active flocculant below that temperature.

EXAMPLE 24

A high molecular weight sample of methyl cellulose (Dow) was dissolved in water at a concentration of 1%. On heating the polymer became cloudy at 65° C. and precipitated at 70° C. When added to a clay suspension this polymer showed flocculating capability at a level of 200 ppm at 25° C. but was ineffective at 85° C.

EXAMPLE 25

A copolymer of N,N-dimethyl acrylamide (70%) and acrylonitrile (30%) was prepared by the procedure of Example 2. The polymer showed good flocculating activity at 25° C. but was ineffective at 85° C.

We claim:

1. A process for accelerating the rate of settling of a suspended, finely divided solids material from aqueous suspension using a polymeric flocculant of molecular weight at least $0.5 \times 10^6$ g/mol and which has a critical flocculation temperature in the approximate range 0° C.–80° C., said critical flocculation temperature being the temperature below which the polymeric flocculant exhibits flocculating ability and above which the polymeric flocculant will not effect flocculation, which comprises adding to said suspension an effective amount of the polymeric flocculant at a temperature below the critical flocculation temperature of the flocculant, said flocculant comprising at least one water soluble polymer of at least 50 mol% of N-isopropylacrylamide or N-isopropylmethacrylamide, or methyl cellulose, separating the settled solids material from the aqueous liquid, then warming the liquid to a temperature above the critical flocculation temperature of the polymeric flocculant, to precipitate said polymeric flocculant, and separating the precipitated polymeric flocculant from said aqueous liquid.

2. A process according to claim 1 wherein said polymer has a viscosity average molecular weight of from about $1 \times 10^6$ to about $200 \times 10^6$.

3. A process according to claim 1 wherein the liquid suspension is an aqueous suspension having clay particles suspended therein.

4. A process according to claim 1 wherein said water soluble polymer is homopolymeric poly(N-isopropylacrylamide).

5. A process according to claim 1 wherein said water soluble polymer is an anionic copolymer of N-isopropylacrylamide.

6. A process according to claim 5 wherein said polymer is a copolymer of N-isopropylacrylamide with at least one monomer selected from acrylic acid, alkali metal acrylates, methacrylic acid, alkali metal methacrylates, and acrylamide.

7. A process according to claim 1 wherein said water soluble polymer is a cationic copolymer of N-isopropylacrylamide.

8. A process according to claim 7 wherein said polymer is a copolymer of N-isopropylacrylamide with at least one monomer selected from dimethylaminopropyl methacrylamide, methacrylamidopropyltrimethylammonium chloride, 2-hydroxy-3-methacryloxypropyltrimethylammonium chloride, methacrylamide-hydroxypropyltrimethyl-ammonium chloride and vinyl pyridine.

9. A process according to claim 1 wherein said water soluble polymer is an nonionic copolymer of N-isopropylacrylamide.

10. A process according to claim 9 wherein said polymer is a copolymer of N-isopropylacrylamide with at least one monomer selected from acrylamide, methacrylamide, N,N-dimethylacrylamide, N-methylol acrylamide, hydroxypropyl acrylate, N-vinyl-pyrrolidone, diacetone acrylamide, 2-hydroxypropyl methacrylate, 2-hydroxypropyl acrylamide, acrylonitrile, methacrylonitrile, styrene, alkyl methacrylates.

11. A process according to claim 1 wherein said water soluble polymer is methylcellulose.

12. A process according to claim 1 wherein said aqueous suspension contains titanium dioxide and clay and said polymeric flocculant consists essentially of a copolymer of a cationic water soluble, high molecular weight of at least 50 mole % N-isopropylacrylamide with a monomer selected from dimethylaminopropyl methacrylamide, methacrylamido-propyltrimethylammonium chloride and methacrylamido-hydroxypropyltrimethlammonium chloride.

13. A process in accordance with claim 1, wherein said liquid aqueous suspension contains sand and clay.

* * * * *